3,254,104
STABILIZED REDUCING AGENTS
Robert Ehrlich, Morristown, N.J., assignor to Thiokol Chemical Corporation, Bristol, Pa., a corporation of Delaware
No Drawing. Filed Nov. 30, 1962, Ser. No. 243,178
5 Claims. (Cl. 260—448)

This invention concerns a novel preparation of a stable aluminum hydride complex.

More particularly this invention relates to a new and improved method of preparing stable aluminum hydride alkyl etherate complexes in good yield from readily available starting materials.

Aluminum hydride is a well known and useful reagent for reducing unsaturated organic compounds as well as reducible groups of organic compounds such as carbonyl, hydroxy, nitro and related groups. Unfortunately the presently available forms of the free aluminum hydride are difficult to handle, ship or store because of their extreme reactivity with many substances. For example, lithium aluminum hydride reacts violently and sometimes explosively with moisture and certain oxygen containing agents such as nitromethane and methanol and it is inactivated by contact with oxygen and $CO_2$. To moderate its reactivity and decrease the risks in handling it, the hydride can be made available in the solid state in the form of its ethyl etherate. This complex retains the reducing propensities of lithium aluminum hydride yet unlike this hydride does not react violently with oxygen or oxidizing agents. Therefore, an improved method of preparing aluminum alkyl etherates particularly the aluminum hydride ethyl etherates is a valuable adjuvant to synthetic organic chemistry and is much to be desired.

The present method of preparing aluminum hydride ethyl etherate (Finholt et al., J.A.C.S. 69, 1119 (1947)) is to react diethyl ether solutions of lithium aluminum hydride and anhydrous aluminum chloride to form the desired etherate product and lithium chloride as a by-product. The prior art process is disadvantageous in several respects. For one, lithium chloride is almost always a contaminant of the etherate product. Since lithium chloride is somewhat hygroscopic, it imparts this undesirable characteristic to the water sensitive product. Another disadvantage of the process is that unless the separation of the by-product lithium chloride is made rapidly, a secondary and competing reaction produces a polymeric aluminum hydride which precipitates out. This polymer is of less value as a reducing agent and its formation is undesirable. The formation of the polymeric aluminum hydride can be prevented by the addition of aluminum chloride but the resulting complex introduces the undesired chloride ion as an impurity. Furthermore, the etherates produced by this process vary in content from batch to batch and are inconstant in their stoichiometric proportions.

Thus it is an object of this invention to prepare aluminum hydride alkyl etherates uncontaminated with lithium chloride in good yield from readily available starting materials and in constant stoichiometric proportion.

It is a further object of this invention to prepare aluminum hydride alkyl etherates particularly aluminum hydride ethyl etherates without the contemporaneous preparation of polymeric aluminum hydrides.

Yet another object of this invention is to produce a convenient source of anhydrous aluminum perchlorate without resorting to the use of the hazardous starting material anhydrous perchloric acid.

The afore-mentioned objects are achieved by the novel process of this invention which is set forth below:

(1) 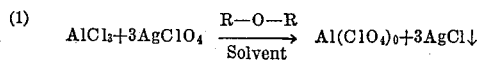

(2) 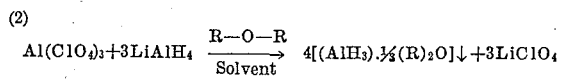

wherein R is an alkyl radical which may be the same or different and contains 1–8 carbon atoms.

In practice the anhydrous silver perchlorate reactant is dissolved in the appropriate dialkyl ether solvent and a solution of anhydrous aluminum chloride in the anhydrous ether is added to the stirred solution. The precipitated silver chloride is filtered off leaving the desired anhydrous aluminum perchlorate in the filtrate. The aluminum perchlorate-dialkyl ether solution is chilled down to $-78$ to $0°$ C. and blanketed with an inert gas such as nitrogen or argon. At this point a solution of the lithium aluminum hydride in the dialkyl ether is added to the chilled stirred solution dropwise. The chilled mixture is allowed to stir for an additional 5–60 minutes at the chilled temperature and then the reaction solution is allowed to warm up to approximately room temperature and the stirring continued for at least 10 minutes preferably from 30 minutes to 60 minutes. During the above addition the aluminum hydride alkyl etherate product is precipitated. After the last stirring step the product is filtered and washed with the dialkyl ether used as the solvent. The precipitated product is sufficiently heat stable to be dried in vacuo at 20 to 80° C. preferably at about 35° C. Drying time is dependent upon the temperature used and the strength of the vacuum.

As indicated by the above brief description of the process the process conditions are relatively flexible. For example the preparation of the aluminum perchlorate solution (Equation 1) can be accomplished at low to high temperatures or at ambient temperatures. Little or no advantage accrues in using extremes of temperature so for convenience sake the reaction is run at substantially ambient temperatures. However, it is desirable to remove the precipitated silver chloride and utilize the aluminum perchlorate solution as soon as possible because of its tendency to pick up moisture from the atmosphere. Similarly aside from requiring low reaction temperature and an inert atmosphere no particular experimental conditions are critical to the success of the second reaction. Neither reaction requires any special order of adding the reactants, or any particular operating pressure. For example the order of adding the reactants can be reversed and sub through super atmospheric pressures can be used. In both reactions stoichiometric quantities of the reagents is desirable but not necessary. As indicated by the afore-mentioned reactions the dialkyl ether used can range from 1–8 carbon atoms in length, and the alkyl groups can be the same or they can differ.

The novel process of this invention is advantageous in several respects. For example yields of over 90% are obtained and the alkyl etherate complex is substantially free from contaminating lithium chloride. In addition the resultant product is relatively stable to heat, moisture and oxygen and the production of the non-stoichiometric, less valuable polymeric aluminum hydride is avoided.

The reactants, aluminum chloride, silver perchlorate, lithium aluminum hydride and the dialkyl ethers are all articles of commerce and their preparation is well documented in the chemical literature including Chemical Abstracts. In each instance chemically pure anhydrous reagents are used. Further advantages as well as illustrations of the inventive process can be determined from the examples which follow.

*Example 1.—Preparation of aluminum hydride ethyl etherate*

(A) *Aluminum Perchlorate Solution.*—A 620 part by weight portion of anhydrous silver perchlorate is dissolved in 1050 parts by weight of anhydrous diethyl ether. The resultant solution is added to a solution of 135 parts by weight of anhydrous aluminum chloride in 1050 parts by weight of anhydrous diethyl ether contained in an appropriate reaction vessel fitted for efficient cooling and stirring. The white precipitate of silver chloride is quickly filtered off and washed with additional anhydrous diethyl ether. The ether washings are added to the aluminum perchlorate solution in ether. Analysis confirmed the precipitate to be silver chloride and the presence of aluminum perchlorate in the diethyl ether filtrate. Based upon the aluminum chloride starting material a 98% yield (430 parts by weight of aluminum perchlorate product) is present.

(B) *Aluminum Hydride Ethyl Etherate.*—The aluminum perchlorate diethyl ether solution is cooled to −78° C. and blanketed with dry nitrogen. A solution of 300 parts by weight of anhydrous lithium aluminum hydride in 1050 parts by weight of diethyl ether is added dropwise to the stirred solution of aluminum perchlorate diethyl ether solution. A white precipitate is formed during the addition of the lithium aluminum hydride solution. After the addition is complete the stirring is continued for 15 minutes at −78° C. and then for 30 minutes at room temperature. The precipitate is filtered off and washed with anhydrous ether and dried in vacuo at 65° C. for 16 hours. A 96.3% yield of product is obtained (228 parts by weight) as a white powdery solid. Hydrolysis and infra-red analysis confirmed the identity of the product as aluminum hydride ethyl etherate and the formula as $[(AlH_3)_3(C_2H_5)_2O]$. Analytical tests for lithium and perchlorate ions are negative.

*Example 2.—Preparation of other aluminum hydride alkyl etherates*

Using the following dialkyl ethers as solvents and the procedure disclosed in Example 1 the representative compounds shown in the left hand column are prepared in essentially quantitative yields.

| Ether: | Product |
|---|---|
| Di-n-propyl ether | Aluminum hydride n-propyl etherate. |
| Diisopropyl ether | Aluminum hydride-isopropyl etherate. |
| Dibutyl ether | Aluminum hydride-butyl etherate. |

In each instance the identity of the product is established by infra-red analysis and hydrolysis. All of the products are free from perchlorate and lithium ion.

I claim:
1. A process for preparing aluminum hydride alkyl etherates comprising the steps of contacting dialkyl ether solutions of aluminum chloride and silver perchlorate, said dialkyl ethers being of the formula:

$$R\text{—}O\text{—}R$$

wherein R is an alkyl group having from 1–8 carbon atoms, removing the precipitated silver chloride formed from said dialkyl ether solution of aluminum perchlorate, cooling said dialkyl ether solution of aluminum perchlorate below 0° C. and contacting said cooled solution with a solution of lithium aluminum hydride in the aforementioned dialkyl ether in an inert atmosphere, and recovering the precipitated aluminum hydride dialkyl etherate product therein.

2. The process of claim 1 wherein the dialkyl ether is diethyl ether.

3. The process of claim 1 wherein the dialkyl ether is di-n-propyl ether.

4. The process of claim 1 wherein the dialkyl ether is diisopropyl ether.

5. The process of claim 1 wherein the dialkyl ether is dibutyl ether.

No references cited.

BENJAMIN HENKIN, *Primary Examiner.*

CARL D. QUARFORTH, *Examiner.*